United States Patent
Dane

(10) Patent No.: US 8,893,495 B2
(45) Date of Patent: Nov. 25, 2014

(54) REVERSIBLE WASTE HEAT RECOVERY SYSTEM AND METHOD

(75) Inventor: Marten H. Dane, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 275 days.

(21) Appl. No.: 13/550,041

(22) Filed: Jul. 16, 2012

(65) Prior Publication Data

US 2014/0013743 A1    Jan. 16, 2014

(51) Int. Cl.
    F02G 3/00    (2006.01)
    F01N 3/02    (2006.01)
    F01K 23/10   (2006.01)
    F02B 27/04   (2006.01)

(52) U.S. Cl.
    USPC ............ 60/616; 60/320; 60/615; 60/618; 60/273

(58) Field of Classification Search
    CPC ............ F02G 5/02; F02G 5/00; F01K 23/10; F01K 23/065; F01N 5/02; Y02T 10/16
    USPC .................. 60/614–618, 320–321
    See application file for complete search history.

(56) References Cited

U.S. PATENT DOCUMENTS

| | | |
|---|---|---|
| 3,232,052 A | 2/1966 | Ricard |
| 3,789,804 A | 2/1974 | Aguet |
| 4,009,587 A | 3/1977 | Robinson, Jr. et al. |
| 4,164,850 A | 8/1979 | Lowi, Jr. |
| 4,204,401 A | 5/1980 | Earnest |
| 4,232,522 A | 11/1980 | Steiger |
| 4,267,692 A | 5/1981 | Earnest |
| 4,271,664 A | 6/1981 | Earnest |
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |

(Continued)

FOREIGN PATENT DOCUMENTS

| | | |
|---|---|---|
| EP | 1 273 785 B1 | 5/2007 |
| JP | 60-222511 A | 11/1985 |

(Continued)

*Primary Examiner* — Christopher Jetton
*Assistant Examiner* — Ngoc T Nguyen
(74) *Attorney, Agent, or Firm* — Foley & Lardner LLP

(57) ABSTRACT

A waste heat recovery (WHR) system operates in a reverse mode, permitting using the WHR system to transfer heat to the exhaust gas of an internal combustion engine. In another configuration, a WHR system may operate in two modes. The first mode removes heat from exhaust gas of an engine to perform useful work. The second mode transfers heat to the exhaust gas. The benefit of this flexible system is that a WHR system is adaptable to rapidly heat exhaust gas at startup and during other conditions where the temperature of the exhaust gas is less than a predetermined operating range. Because of the ability to rapidly warm engine exhaust gas, an exhaust gas receiving system, such as an EGR or an aftertreatment system, may function to reduce the emissions of the engine more quickly. Because this system is reversible, it retains the capability of a conventional WHR system.

22 Claims, 4 Drawing Sheets

(56) References Cited

U.S. PATENT DOCUMENTS

| | | | |
|---|---|---|---|
| 5,649,513 | A | 7/1997 | Kanda |
| 5,685,152 | A | 11/1997 | Sterling |
| 5,771,868 | A | 6/1998 | Khair |
| 5,806,322 | A | 9/1998 | Cakmakci et al. |
| 5,915,472 | A | 6/1999 | Takikawa et al. |
| 5,950,425 | A | 9/1999 | Takahashi et al. |
| 6,014,856 | A | 1/2000 | Bronicki et al. |
| 6,035,643 | A | 3/2000 | Rosenblatt |
| 6,055,959 | A | 5/2000 | Taue |
| 6,138,649 | A | 10/2000 | Khair et al. |
| 6,301,890 | B1 | 10/2001 | Zeretzke |
| 6,321,697 | B1 | 11/2001 | Matsuda et al. |
| 6,324,849 | B1 | 12/2001 | Togawa et al. |
| 6,393,840 | B1 | 5/2002 | Hay |
| 6,494,045 | B2 | 12/2002 | Rollins, III |
| 6,523,349 | B2 | 2/2003 | Viteri |
| 6,571,548 | B1 | 6/2003 | Bronicki et al. |
| 6,598,397 | B2 | 7/2003 | Hanna et al. |
| 6,606,848 | B1 | 8/2003 | Rollins, III |
| 6,637,207 | B2 | 10/2003 | Konezciny et al. |
| 6,701,712 | B2 | 3/2004 | Bronicki et al. |
| 6,715,296 | B2 | 4/2004 | Bakran et al. |
| 6,745,574 | B1 | 6/2004 | Dettmer |
| 6,748,934 | B2 | 6/2004 | Natkin et al. |
| 6,751,959 | B1 | 6/2004 | McClanahan et al. |
| 6,792,756 | B2 | 9/2004 | Bakran et al. |
| 6,810,668 | B2 | 11/2004 | Nagatani et al. |
| 6,817,185 | B2 | 11/2004 | Coney et al. |
| 6,848,259 | B2 | 2/2005 | Kelller-Sornig et al. |
| 6,877,323 | B2 | 4/2005 | Dewis |
| 6,880,344 | B2 | 4/2005 | Radcliff et al. |
| 6,910,333 | B2 | 6/2005 | Minemi et al. |
| 6,928,820 | B2 * | 8/2005 | Inaba et al. ............ 60/618 |
| 6,935,129 | B2 * | 8/2005 | Sasaki et al. ............ 60/618 |
| 6,964,168 | B1 | 11/2005 | Pierson et al. |
| 6,977,983 | B2 | 12/2005 | Correia et al. |
| 6,986,251 | B2 | 1/2006 | Radcliff et al. |
| 7,007,487 | B2 | 3/2006 | Belokon et al. |
| 7,028,463 | B2 | 4/2006 | Hammond et al. |
| 7,044,210 | B2 | 5/2006 | Usui |
| 7,069,884 | B2 | 7/2006 | Baba et al. |
| 7,117,827 | B1 | 10/2006 | Hinderks |
| 7,121,906 | B2 | 10/2006 | Sundel |
| 7,131,259 | B2 | 11/2006 | Rollins, III |
| 7,131,290 | B2 | 11/2006 | Taniguchi et al. |
| 7,159,400 | B2 | 1/2007 | Tsutsui et al. |
| 7,174,716 | B2 | 2/2007 | Brasz et al. |
| 7,174,732 | B2 | 2/2007 | Taniguchi et al. |
| 7,178,358 | B2 * | 2/2007 | Inaba et al. ............ 62/498 |
| 7,191,740 | B2 | 3/2007 | Baba et al. |
| 7,200,996 | B2 | 4/2007 | Cogswell et al. |
| 7,225,621 | B2 | 6/2007 | Zimron et al. |
| 7,281,530 | B2 | 10/2007 | Usui |
| 7,325,401 | B1 | 2/2008 | Kesseli et al. |
| 7,340,897 | B2 | 3/2008 | Zimron et al. |
| 7,392,655 | B2 * | 7/2008 | Inaba et al. ............ 60/616 |
| 7,454,910 | B2 * | 11/2008 | Hamada et al. ............ 60/618 |
| 7,454,911 | B2 | 11/2008 | Tafas |
| 7,454,912 | B2 * | 11/2008 | Yamanaka et al. ............ 60/618 |
| 7,469,540 | B1 | 12/2008 | Knapton et al. |
| 7,578,139 | B2 | 8/2009 | Nishikawa et al. |
| 7,665,304 | B2 | 2/2010 | Sundel |
| 7,721,552 | B2 | 5/2010 | Hansson et al. |
| 7,797,940 | B2 | 9/2010 | Kaplan |
| 7,823,381 | B2 | 11/2010 | Misselhorn |
| 7,833,433 | B2 | 11/2010 | Singh et al. |
| 7,866,157 | B2 | 1/2011 | Ernst et al. |
| 7,942,001 | B2 | 5/2011 | Radcliff et al. |
| 7,958,873 | B2 | 6/2011 | Ernst et al. |
| 7,997,076 | B2 | 8/2011 | Ernst |
| 8,635,871 | B2 * | 1/2014 | Ernst et al. ............ 60/618 |
| 2002/0099476 | A1 | 7/2002 | Hamrin et al. |
| 2003/0033812 | A1 | 2/2003 | Gerdes et al. |
| 2003/0213245 | A1 | 11/2003 | Yates et al. |
| 2003/0213246 | A1 | 11/2003 | Coll et al. |
| 2003/0213248 | A1 | 11/2003 | Osborne et al. |
| 2004/0216483 | A1 * | 11/2004 | Inaba et al. ............ 62/498 |
| 2005/0262842 | A1 | 12/2005 | Claassen et al. |
| 2008/0289313 | A1 | 11/2008 | Batscha et al. |
| 2009/0031724 | A1 | 2/2009 | Ruiz |
| 2009/0090109 | A1 | 4/2009 | Mills et al. |
| 2009/0121495 | A1 | 5/2009 | Mills |
| 2009/0133646 | A1 | 5/2009 | Wankhede et al. |
| 2009/0151356 | A1 | 6/2009 | Ast et al. |
| 2009/0179429 | A1 | 7/2009 | Ellis et al. |
| 2009/0211253 | A1 | 8/2009 | Radcliff et al. |
| 2009/0320477 | A1 | 12/2009 | Juchymenko |
| 2009/0322089 | A1 | 12/2009 | Mills et al. |
| 2010/0018207 | A1 | 1/2010 | Juchymenko |
| 2010/0071368 | A1 | 3/2010 | Kaplan et al. |
| 2010/0083919 | A1 | 4/2010 | Bucknell |
| 2010/0139626 | A1 | 6/2010 | Raab et al. |
| 2010/0180584 | A1 | 7/2010 | Berger et al. |
| 2010/0192569 | A1 | 8/2010 | Ambros et al. |
| 2010/0229525 | A1 | 9/2010 | Mackay et al. |
| 2010/0257858 | A1 | 10/2010 | Yaguchi et al. |
| 2010/0263380 | A1 | 10/2010 | Biederman et al. |
| 2010/0282221 | A1 | 11/2010 | Le Lievre |
| 2010/0288571 | A1 | 11/2010 | Dewis et al. |
| 2011/0005477 | A1 | 1/2011 | Terashima et al. |
| 2011/0006523 | A1 | 1/2011 | Samuel |
| 2011/0094485 | A1 | 4/2011 | Vuk et al. |
| 2011/0209473 | A1 | 9/2011 | Fritz et al. |
| 2012/0023946 | A1 | 2/2012 | Ernst et al. |

FOREIGN PATENT DOCUMENTS

| | | |
|---|---|---|
| JP | 8-68318 A | 3/1996 |
| JP | 9-32653 A | 2/1997 |
| JP | 10-238418 A | 9/1998 |
| JP | 11-166453 A | 6/1999 |
| JP | 2005-36787 A | 2/2005 |
| JP | 2005-42618 A | 2/2005 |
| JP | 2005-201067 A | 7/2005 |
| JP | 2005-329843 A | 12/2005 |
| JP | 2008-240613 A | 10/2008 |
| JP | 2009-167995 A | 7/2009 |
| JP | 2009-191647 A | 8/2009 |
| JP | 2010-77964 A | 4/2010 |
| WO | 2009/098471 A2 | 8/2009 |

\* cited by examiner

REVERSIBLE WASTE HEAT RECOVERY SYSTEM AND METHOD

TECHNICAL FIELD

This disclosure relates to a waste heat recovery (WHR) system and method using a Rankine cycle. The WHR system and method is operable to accept heat that is deliverable to an aftertreatment device of an internal combustion engine, permitting optimal operation of the aftertreatment device with respect to emissions. The WHR system may also include a conventional configuration for converting waste heat generated from one or more engine sources to useful work.

BACKGROUND

WHR systems of various configurations have been used to convert waste or excess heat generated by an internal combustion engine to useful work. Such systems have undergone an array of improvements and refinements and work well for their intended purpose. While these systems work well, expanding the flexibility of such systems to serve other than their traditional functions may yield unexpected performance improvements for an associated engine.

SUMMARY

This disclosure provide an internal combustion engine comprising an exhaust gas circuit, a heat exchanger positioned along the exhaust gas circuit, an exhaust gas receiving portion positioned along the exhaust gas circuit downstream of the heat exchanger, and a waste heat recovery (WHR) system. The WHR system includes a working fluid circuit that extends through the heat exchanger, a condenser/evaporator positioned along the working fluid circuit, a switching valve positioned along the working fluid circuit between the heat exchanger and the condenser/evaporator, and a parallel circuit portion positioned along the working fluid circuit between the switching valve and the heat exchanger. The parallel circuit portion includes a first branch and a second branch positioned in parallel to the first branch, a feed pump positioned along the first branch, and an expansion valve positioned along the second branch, and a turbine-compressor positioned along the working fluid circuit between the condenser/evaporator and the heat exchanger.

This disclosure also provides an internal combustion engine comprising an exhausts gas circuit, a heat exchanger positioned along the exhaust gas circuit downstream of the heat exchanger, and a waste heat recovery (WHR) system. The WHR system includes a working fluid circuit extending through the heat exchanger, a switching valve positioned along the working fluid circuit, and a first branch and a second branch extending between the switching valve and the heat exchanger. The WHR system also includes an energy conversion portion positioned along the first branch downstream from the switching valve, a fluid containment and cooling system (FCCS) positioned along the first branch between the energy conversion portion and the switching valve, and a feed pump positioned along the first branch between the FCCS and the switching valve. The WHR system further includes an expansion valve positioned along the second branch downstream from the switching valve, a compressor positioned along the second branch downstream of the expansion valve, and an evaporator positioned along the second branch between the expansion valve and the compressor.

This disclosure also provides an internal combustion engine comprising an exhaust gas circuit, a heat exchanger positioned along the exhaust gas circuit, an exhaust gas receiving portion positioned along the exhaust gas circuit downstream of the heat exchanger, and a waste heat recovery (WHR) system. The WHR system includes a working fluid circuit extending through the heat exchanger, an expansion valve positioned along the working fluid circuit downstream from the heat exchanger, an evaporator positioned along the working fluid circuit downstream from the expansion valve, and a compressor positioned along the working fluid circuit between the evaporator and the heat exchanger, downstream from the evaporator.

This disclosure also provides a method of heating and cooling an exhaust gas flowing through an exhaust gas circuit of an internal combustion engine. The method comprises directing the exhaust gas through a heat exchanger positioned along the exhaust gas circuit and extending a waste heat recovery (WHR) system, including a working fluid circuit, through the heat exchanger. The WHR system includes a first mode of operation that provides heated working fluid to the heat exchanger and a second mode of operation to provide cooled working fluid to the heat exchanger. The working fluid flow through the working fluid circuit is in a first direction in one of the first mode and second mode of operation and is in a second direction in the other of the first mode and the second mode of operation.

Advantages and features of the embodiments of this disclosure will become more apparent from the following detailed description of exemplary embodiments when viewed in conjunction with the accompanying drawings.

DETAILED DESCRIPTION

Applications of a Rankine cycle, which includes an organic Rankine cycle, for increasing the thermal efficiency of internal combustion engines are increasing. A Rankine cycle can convert a portion of heat energy in an internal combustion engine, such as exhaust gas heat energy and other engine heat sources (e.g., engine oil, exhaust gas, charge gas, water jackets), that would normally would wasted, into energy that can perform useful work. This configuration thus forms a Rankine cycle waste heat recovery (WHR) system. In converting the captured heat energy into useful work, a portion of the waste heat energy can be recovered to enhance an engine's efficiency. While such systems have been refined and improved, they remain limited in the scope of functions they perform in an engine. The present disclosure provides a WHR system that is able to provide heat flow in a reverse direction to counter-intuitively add heat to an exhaust system, rather than just capturing heat from a conventional exhaust system. The added heat is able to perform valuable functions in an exhaust system, such as filter regeneration and emission reduction.

Figure 1:
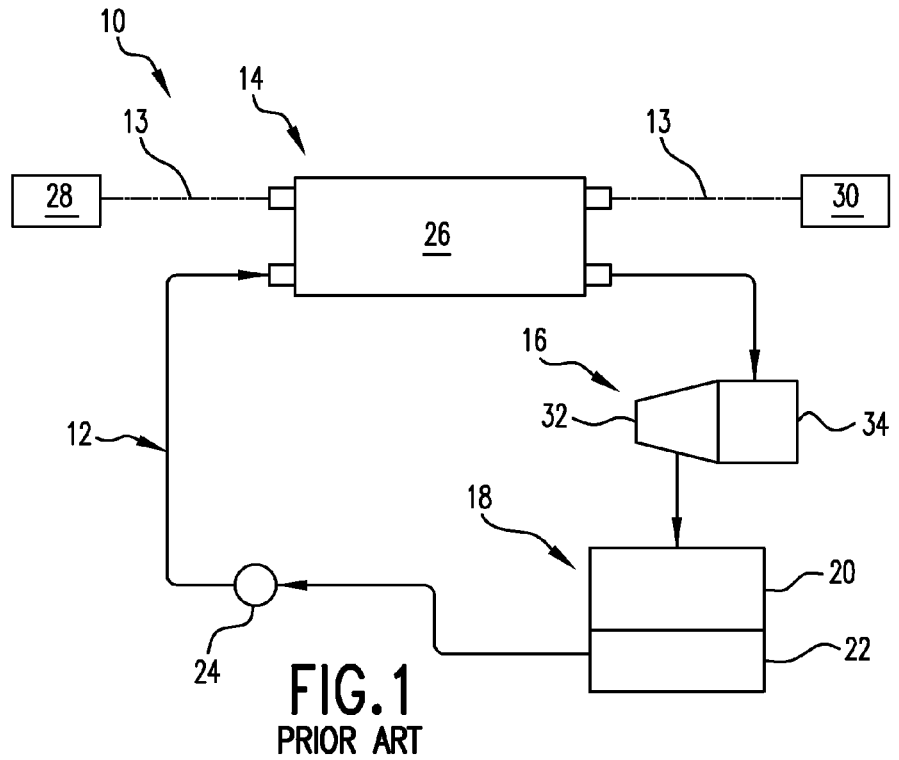
FIG. 1 is a simplified schematic of a conventional Rankine cycle WHR system.

Turning now to the figures, shown in FIG. 1 is a conventional Rankine cycle WHR system 10. WHR system 10 includes a working fluid circuit 12, along which are located a heat exchange portion 14, an energy capture portion 16, and an exhaust circuit 13.

Working fluid circuit 12 includes a fluid containment and cooling system (FCCS) 18. FCCS 18 may include a variety of devices for containing and cooling a working fluid. For example, FCCS 18 may include a condenser 20 for changing the phase of a vaporized working fluid to a liquid. Condenser 20 may have a sub-cooling portion or a sub-cooler 22 located along circuit 12 downstream from condenser 20. FCCS 18 may include other elements, for example, a receiver, a pump, one or more valves, and/or other elements (not shown) to transfer fluid between the various components of FCCS 18.

A working fluid or feed pump 24 is located along working fluid circuit 12 downstream from FCCS 18. Feed pump 24 pulls liquid working fluid from FCCS 18 and pumps the liquid working fluid downstream along working fluid circuit 12 toward heat exchange portion 14. Heat exchange portion 14 includes at least one heat exchanger, one of which may be a boiler heat exchanger 26. Though not shown, there may be additional heat exchangers between pump 24 and boiler heat exchanger 26. These additional heat exchangers may be one or more of a plurality of heat exchangers, such as an exhaust heat exchanger, a pre-charge air cooler heat exchanger, a recuperator, or other heat exchangers that may benefit from an exchange of heat with the relatively cool liquid working fluid coming from FCCS 18. These heat exchangers may be in series, parallel, or a combination of series and parallel.

Boiler heat exchanger 26 may be an EGR boiler/superheater or may be an exhaust gas boiler/superheater accepting exhaust gas from an engine, which then flows downstream to an aftertreatment system. In this example, boiler heat exchanger 26 receives exhaust gas from an upstream exhaust gas source 28, which includes a plurality of elements, such as an exhaust manifold (not shown), and may include other elements, such as a turbocharger turbine (not shown). The exhaust gas that flows through heat exchanger 26 flows downstream to an aftertreatment system 30. Aftertreatment system 30 may include a variety of elements, such as one or more filters, one or more oxidation catalysts, one or more selective catalytic reduction (SCR) devices, or other elements (not shown). Many of the conventional elements of aftertreatment system 30, for example an SCR device, benefit from the heat of an internal combustion engine. Indeed, some of these elements, such as the SCR device, require a temperature elevated well above ambient and will not operate during startup conditions and for a period after startup until reaching an elevated operating temperature. During the period between startup and reaching an elevated temperature, the SCR device and other, similar devices, permit elevated emissions, such as NOx and carbon monoxide, to exhaust to the atmosphere.

Energy capture portion 16 is positioned between heat exchange portion 14 and FCCS 18, downstream from heat exchange portion 14. Energy capture portion 16 may include a conversion device 32. Conversion device 32 may connect to an auxiliary system 34.

WHR system 10 works as follows. FCCS 18 contains a supply of liquid working fluid. Pump 24 pulls the liquid working fluid from FCCS 18 and forces the liquid working fluid through working fluid circuit 12. The liquid working fluid travels downstream from pump 24 into heat exchanger 26. Heat from exhaust gas entering heat exchanger 26 from upstream exhaust gas source 28 is transferred to the liquid working fluid, changing the phase of the working fluid from liquid to a relatively high-pressure vapor. The vaporized working fluid moves downstream to energy capture portion 16. As the vaporized working fluid flows through a conversion device 32 of energy capture portion 16, the vaporized working fluid expands and cools, transferring energy to conversion device 32. The energy transferred to conversion device 32 may now be used to drive or operate other systems, such as auxiliary system 34. The vaporized working fluid flows downstream to FCCS 18, where the vaporized working fluid is condensed, cooled and stored to be available to travel through working fluid circuit 12 again.

The working fluid described in the configuration shown in FIG. 1 and in subsequent figures can be a non-organic or an organic working fluid. Some examples of working fluid are Genetron® R-245fa from Honeywell, Therminol®, Dowtherm J™ from Dow Chemical Co., Fluorinol® from American Nickeloid, toluene, dodecane, isododecane, methylundecane, neopentane, octane, water/methanol mixtures, and steam. [Inventor: Note that we discuss the addition of recuperators and other heat exchangers in paragraph 18.]

Figure 2:
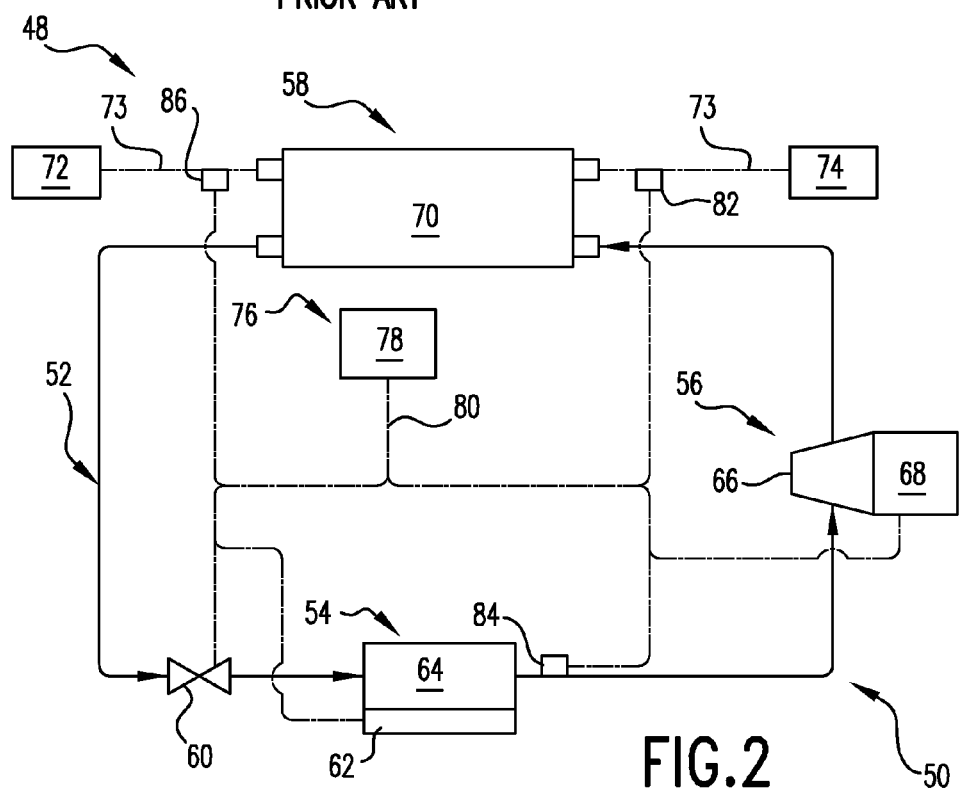
FIG. 2 is a schematic of a first exemplary embodiment of the present disclosure.

A first exemplary embodiment of the present disclosure is shown in FIG. 2. An internal combustion engine 48 includes a WHR system 50, an exhaust gas source 72, an exhaust gas circuit 73, and an exhaust gas receiving portion 74. WHR system 50 includes a working fluid circuit 52, along which are located an evaporation portion 54, a compression portion 56, a heat exchange portion 58, and a conventional expansion valve 60. WHR system 50 is configured to operate in a manner opposite or in reverse to that of conventional WHR system 10 shown in FIG. 1, providing heat to exhaust gas flowing through heat exchange portion 58 rather than making use of waste heat from the exhaust gas.

Evaporation portion 54 includes an evaporator 64 and may include a heat source 62. Heat source 62 may be an electrical heater or another type of heat source that is operable to generate or provide heat on demand. Heat source 62 is connected to or attached to evaporator 64 so that heat from heat source 62 is transferred to evaporator 64. If compressor portion 56 provides sufficient heat to the working fluid to meet the heating needs of heat exchange portion 58, which is determined by analyzing or measuring the performance and capacity of the components of WHR system 50 under expected operating conditions, then heat source 62 may unnecessary. All subsequent heat sources associated with evaporators are similarly optional for the same reason. Compressor portion 56, which includes a compressor 66 driven by a motor 68, is positioned along working fluid circuit 52 downstream from evaporator 64. Motor 68 may be an electrical motor or a mechanical motor. Motor 68 may be driven by an electrical system of engine 48 or a mechanical linkage to engine 48.

Heat exchange portion 58 is located along working fluid circuit 52 downstream from compressor portion 56. Heat exchange portion 58 includes a heat exchanger 70 to receive exhaust gas from exhaust gas source 72 via exhaust gas circuit 73. The exhaust gas flowing through heat exchanger 70 flows downstream through exhaust gas circuit 73 to exhaust gas receiving portion 74. Heat exchanger 70 is configured to transfer heat from the liquid working fluid to the exhaust gas. Exhaust gas receiving portion 74 may include a conventional exhaust gas recirculation (EGR) system or a conventional aftertreatment system.

Expansion valve 60 is located along working fluid circuit 52 downstream from heat exchanger 70. Expansion valve 60 is configured to permit an abrupt drop in the pressure of the working fluid, causing partial evaporation of the working fluid and a subsequent drop in temperature. The working fluid then flows downstream to evaporation portion 54.

WHR system 50 also includes a control system 76. Control system 76 may include a control module 78, a wire harness 80, a first temperature sensor 82 positioned along exhaust gas circuit 73 between heat exchanger 70 and exhaust gas receiving portion 74, a second temperature sensor 84 positioned along working fluid circuit 52 downstream of evaporation portion 54, and a third temperature sensor 86 positioned along exhaust gas circuit 73 upstream of heat exchanger 70.

Control module 78 may be an electronic control unit or electronic control module (ECM) that monitors the performance of WHR system 50 or may monitor other conditions of engine 48 or an associated vehicle in which WHR system 50 may be located. Control module 78 may be a single processor, a distributed processor, an electronic equivalent of a processor, or any combination of the aforementioned elements, as well as software, electronic storage, fixed lookup tables and the like. Control module 78 may connect to certain components of engine 48 by wire harness 80, though such connection may be by other means, including a wireless system. For example, control module 78 may connect to expansion valve 60, heat source 62, and compressor 68. Control module 78 may include a digital or analog circuit.

WHR system 50 is configured to transfer heat to the exhaust gas flowing through heat exchanger 70 when commanded by control system 76. Thus, WHR system 50 operates in a manner opposite to that of WHR system 10 shown in FIG. 1 in that, in the present disclosure, heat is added to the exhaust gas flowing through heat exchanger 70, whereas heat is removed from the exhaust gas flowing through conventional heat exchanger 26 in conventional WHR system 10.

Control module 78 monitors the temperature of exhaust gas flowing from heat exchanger 70 toward exhaust gas receiving portion 74 by receiving a temperature signal from temperature sensor 82. If the temperature of the exhaust gas is less than a predetermined minimum operating temperature or a predetermined operating temperature range for the components of exhaust gas receiving portion 74 to treat the emissions from engine 48, then control module 78 sends a command to motor 68 to cause motor 68 to operate, driving compressor 66. Control module 78 may vary the speed of motor 68, and thus the speed of compressor 66, as well as cycling compressor 66 on and off to vary the amount of heat imparted to the working fluid through compression. Control module 78 may also receive a temperature signal from second temperature sensor 84 indicating the temperature of the working fluid flowing through working fluid circuit 52 from evaporator 64 to compressor 66. If the temperature signal from second temperature sensor 84 indicates that the temperature of the working fluid flowing from evaporator 64 is insufficient to raise the temperature of the exhaust gas flowing into heat exchanger 70 to a predetermined temperature range, then control module 78 sends a control signal to heat source 62 to cause heat source 62 to generate heat or to generate additional heat.

The heat from source 62 warms the vaporized working fluid in evaporator 64. The vaporized working fluid is pressurized by the action of compressor 66, becoming a superheated vapor. The superheated vaporized working fluid flows through working fluid circuit 52 to heat exchanger 70, where a portion of the heat in the working fluid transfers to the exhaust gas flowing through heat exchanger 70. The amount of heat in the vaporized working fluid, controlled by the temperature in evaporator 64 and by compressor 66, determines the amount of heat transferred to the exhaust gas and thus the temperature of the exhaust gas. Control module 78 monitors the temperature of the exhaust gas flowing downstream through exhaust gas circuit 73 to exhaust gas receiving portion 74 by receiving a signal indicative of the temperature of the exhaust gas from temperature sensor 82. Depending on the temperature of the exhaust gas in comparison to a predetermined operating temperature range of the components of exhaust gas receiving portion 74, control module 78 sends control signals to the devices of WHR system 50 that either increases or decreases the temperature of the working fluid flowing into heat exchanger 70.

Such temperature sensitive exhaust gas system components may include one or more SCR's and one or more oxidation catalysts. Though not shown, WHR system 50 may be used to directly heat elements of exhaust gas receiving portion 74, such as catalysts and filters, improving the speed at which regeneration and operation temperatures are achieved. WHR system 50 may also benefit an EGR system by increasing the temperature of EGR gases more quickly, permitting introduction of EGR gases earlier than would be possible without the benefit of the heating provided by WHR system 50. The ability to introduce heat to the exhaust gas stream flowing into an EGR system also permits reducing harmful condensation in the EGR system.

Temperature sensor 86 may also provide a temperature signal to control module 78. Control module 78 may use this temperature signal to anticipate the amount of additional heat that may need to be added to the working fluid. For example, control module 78 may determine that a minimum predetermined temperature will be reached within a time frame that is approximately equivalent to the time it takes to decrease the addition of heat to the working fluid. In this circumstance, control module 78 may reduce the amount of heat added to the working fluid, or may cease the addition of heat completely, to reduce or prevent excess heat addition to the working fluid, which could increase the temperature of the exhaust gas beyond a desirable temperature range.

The temperature of the working fluid drops with the transfer of heat to the exhaust gas in heat exchanger 70, causing the working fluid to change phase from a vapor to a liquid. The liquid working fluid flows downstream through working fluid circuit 52 to conventional expansion valve 60. Expansion valve 60 causes the pressure of the liquid working fluid to decrease rapidly or abruptly, causing some of the liquid working fluid to change phase to a vapor and simultaneously cooling the working fluid. Expansion valve 60 may be controllable by signals sent to expansion valve 60 from control module 78, which regulates the amount of expansion and thus the amount of cooling provided to the working fluid. Control module 78 may base these control signals on signals from one or more sensors, such as temperature sensor 84. A combination of vaporized and liquid working fluid flows to evaporator 64, where the working fluid is available to pass through working fluid circuit 52 again.

Figure 3:
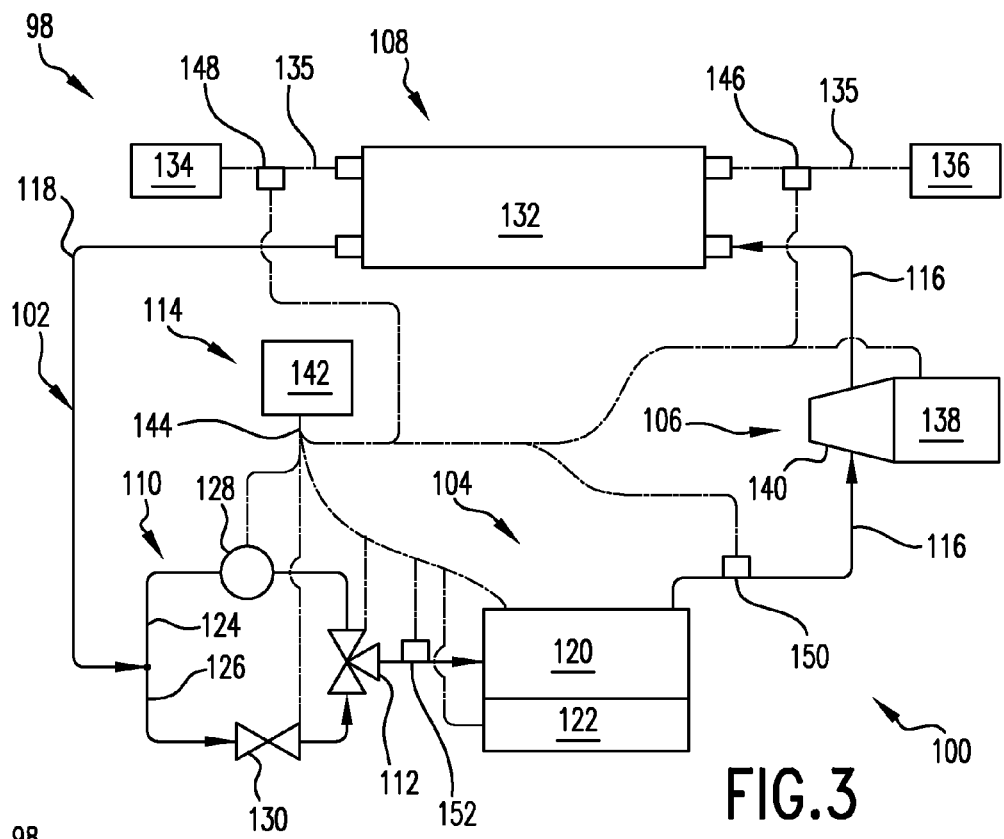
FIG. 3 is a schematic of a second exemplary embodiment of the present disclosure with the WHR system configured for a first, heating mode of operation.
Figure 4:
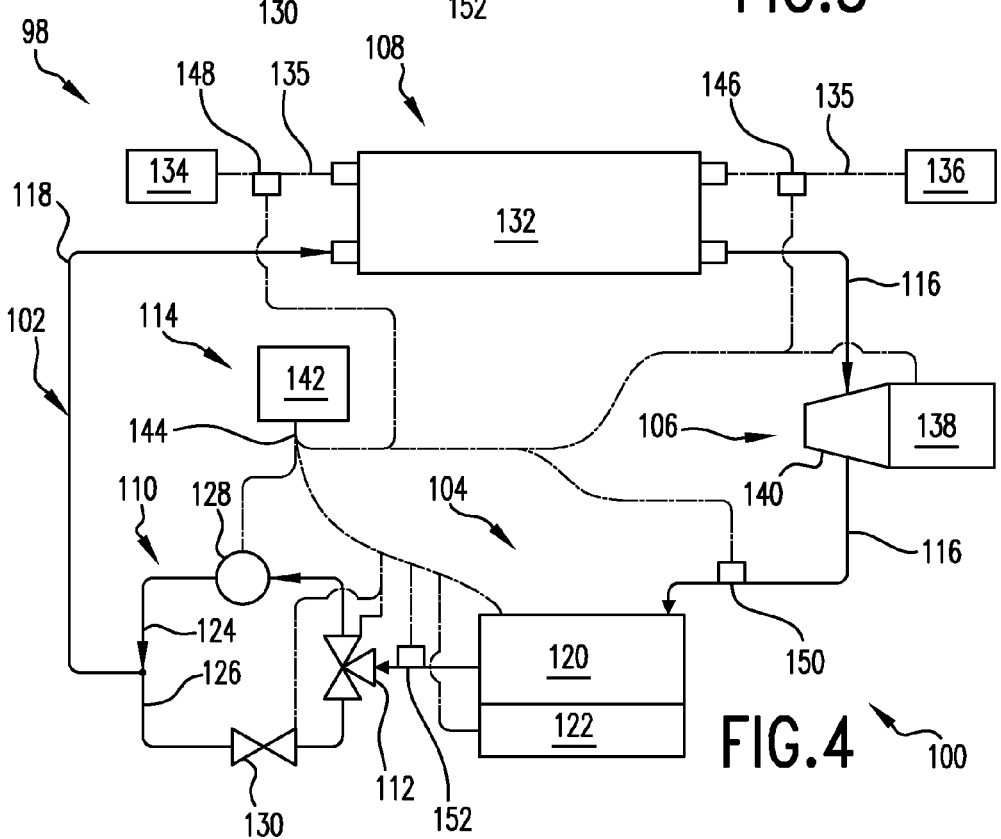
FIG. 4 is the schematic of FIG. 3 with the WHR system configured for a second, cooling mode of operation.

A second exemplary embodiment in accordance with the present disclosure is shown in FIGS. 3 and 4. An internal combustion engine 98 includes a bi-directional or reversible WHR system 100, an exhaust gas source 134, an exhaust gas circuit 135, and an exhaust gas receiving portion 136. WHR system 100 combines the features of a conventional WHR system, such as WHR system 10 shown in FIG. 1, with the features of a reversed WHR system, such as WHR system 50 shown in FIG. 2.

WHR system 100 includes a working fluid circuit 102, a condensing and evaporating portion 104, an energy transfer portion 106, a heat exchanger-condenser portion 108, a switching valve 112, and a control system 114. Working fluid circuit 102 includes a parallel portion 110. As will be seen, the fluid flow through working fluid circuit 102, with the exception of parallel portion 110, is bi-directional. Thus, downstream and upstream positions of the various components depend on the operational configuration of working fluid circuit 102, as will be discussed in more detail hereinbelow.

Condensing and evaporating portion 104 and heat exchanger-condenser portion 108 are located along working fluid circuit 102. Working fluid circuit 102 includes a first portion 116 and a second portion 118, each of which extends between condensing and evaporating portion 104 and heat exchanger-condenser portion 108. Located along first portion 116 of working fluid circuit 102 is energy transfer portion 106. Switching valve 112 is located along second portion 118 of working fluid circuit 102. Parallel portion 110 is also located along second portion 118, between switching valve 112 and heat exchanger-condenser portion 108.

Condensing and evaporating portion 104 may include multiple elements. For example, condensing and evaporating portion 104 includes a combination condenser and evaporator 120, but it may also include a heater 122. Condensing and evaporating portion 104 may also include one or more other devices, such as a sub-cooler (not shown) and a receiver (not shown). As will be seen, the function of condensing and evaporating portion 104 is either to condense a working fluid flowing through working fluid circuit 102, or to vaporize a working fluid flowing through working fluid circuit 102, depending on the mode of operation.

Switching valve 112 is located along second portion 118 of working fluid circuit 102 and is fluidly connected to condenser and evaporator 120. Switching valve 112 determines which fluid branch in parallel portion 110 fluidly connects to condenser and evaporator 120. A first branch 124 includes a working fluid pump 128. Working fluid pump 128 is operable to establish a first direction of working fluid flow through working fluid circuit 102. A second branch 126 includes an expansion valve 130, which operates in a manner similar to expansion valve 60 shown in FIG. 2. While switching valve 112 is shown as a three-way valve, valve 112 could be multiple two-way valves, with a first valve positioned between condenser-evaporator 120 and feed pump 128, and a second valve connected along a branch that extends from between the first valve and condenser-evaporator 120 to expansion valve 130.

Heat exchange portion 108 is fluidly connected to parallel portion 110. Heat exchange portion 108 includes a heat exchanger 132 that serves to act as a boiler/evaporator or as a condenser. Heat exchanger 132 receives exhaust gas from exhaust gas source 134 via exhaust gas circuit 135. Exhaust gas source 134 may include conventional elements such as an exhaust manifold (not shown). The exhaust gas received from exhaust gas source 134 flows through heat exchanger 132 and downstream through exhaust gas circuit 135 to exhaust gas receiving portion 136. Exhaust gas receiving portion 136 may include a conventional exhaust gas recirculation (EGR) system or a conventional aftertreatment system.

Fluidly connected to heat exchange portion 108 is energy transfer portion 106. Energy transfer portion 106 includes a reversible or bidirectional motor generator 138 that is connected to a turbine-compressor 140. Energy transfer portion 106 is capable of converting energy from the working fluid in WHR system 100 to useful energy, such as the rotational energy of a shaft, and is also capable of adding energy to the working fluid of WHR system 100, as will be described hereinbelow.

Control system 114 includes a control module 142, a wire harness 144, and a plurality of temperature sensors. Control module 142 may be similar to control module 78 of the first exemplary embodiment and wire harness 144 may be similar to wire harness 80 of the first exemplary embodiment. The plurality of temperature sensors may include a first temperature sensor 146 positioned along exhaust gas circuit 135 downstream from heat exchange portion 108, a second temperature sensor 148 positioned along exhaust gas circuit 135 upstream from heat exchange portion 108, a third temperature sensor 150 positioned along working fluid circuit 102 between condensing and evaporating portion 104 and energy transfer portion 106, and a fourth temperature sensor 152 positioned along working fluid circuit 102 between condensing and evaporating portion 104 and switching valve 112. These temperature sensors provide signals to control module 142 indicative of the condition of the working fluid in working fluid circuit 102. Control module 142 may send control signals to various portions of WHR system 100 based on the signals from the various temperature sensors. For example, control module 142 may send control signals to switching valve 112, condenser-evaporator 120, heater 122, working fluid pump 128, and motor generator 138.

WHR system 100 includes two modes of operation, which are generally dependent on the temperature of the exhaust gas flowing through heat exchange portion 108, which may be indicated by signals from first temperature sensor 146 and/or second temperature sensor 148 to control module 142. The first mode of operation, which is shown in FIG. 3, may be described as a heating mode from the perspective of the exhaust gas. The second mode of operation, which is shown in FIG. 4, may be described as a cooling mode from the perspective of the exhaust gas.

Control module 142 may determine that the temperature of the exhaust gas flowing to exhaust gas receiving portion 136 is less than a predetermined temperature range necessary for the proper functioning of gas receiving portion 136. For example, gas receiving portion 136 may include one or more oxidation catalysts or SCR devices requiring a temperature range well above ambient for proper operation. During initial or cold start of engine 98, the temperature of the exhaust gas may be at ambient, which could be a relatively cold ambient during cold weather operation. Because gas receiving portion 136 operates either poorly or not at all at temperatures less than a predetermined temperature range, engine 98 could have an elevated level of emissions, which may include NOx and carbon monoxide, until the temperature of the exhaust gas is raised.

If control module 142 determines that the temperature of the exhaust gas is less than a predetermined temperature range, control module 142 may send control signals to various portions of WHR system 100 to put WHR system 100 in the heating mode of operation, as shown in FIG. 3. In the heating mode of operation, working fluid flows through working fluid circuit 102 in the direction shown by the arrows in FIG. 3, which is generally counter-clockwise. Control module 142 may send a control signal to heater 122 to cause heater 122 to operate. Heater 122 may be unnecessary if turbine-compressor 140 is capable of providing sufficient heat to the working fluid to meet the needs of exhaust gas receiving portion 136 by compressing the working fluid. Control module 142 then sends a control signal to motor generator 138 to pump working fluid from condensing and evaporation portion 104 downstream to heat exchange portion 108, and to switching valve 112 to fluidly connect expansion valve 130 to condensing and evaporation portion 104 by permitting flow through second branch 126 while blocking flow through first branch 124. Heater 122 raises the temperature of working fluid in condenser-evaporator 120, vaporizing the working fluid. The vaporized working fluid flows toward compressor 140, where the vaporized working fluid is compressed, simultaneously superheating the vaporized working fluid. The superheated working fluid flows downstream from compressor 140 into heat exchanger 132, where the heat from the working fluid transfers to the exhaust gas flowing through heat exchanger 132, cooling and condensing the working fluid to a liquid. Thus, heat exchanger 132 functions as a condenser for working fluid circuit 102 in this mode of operation. The liquid working fluid flows from heat exchanger 132 downstream to parallel portion 110. Because switching valve 112 provides a flow path through second branch 126 of parallel portion 110, the liquid working fluid flows through expansion valve 130. As the liquid working fluid flows through conventional expansion valve 130, the pressure of the liquid working fluid drops dramatically, causing a portion of the working fluid to vaporize and causing the working fluid to rapidly cool. The working fluid then flows downstream to condenser-evaporator 120, where the process may begin again. Control module 142 may also send control signals to expansion valve 130 that controls the amount of expansion, and thus the amount of cooling, provided by expansion valve 130.

During operation of WHR system 100, control module 142 continuously monitors the temperature of the exhaust gas flowing through heat exchanger 132 and the temperature of the working fluid flowing through working fluid circuit 102. For example, if the temperature of the exhaust gas is less than a predetermined temperature range, previously described, then control module 142 may determine by way of a temperature signal from temperature sensor 150 whether additional heat may be added to the working fluid. If additional heat may be added, control module 142 either may continue to operate heater 122 or, if possible, may increase the temperature of heater 122. Control module 142 may also be able to increase the amount of compression of the working fluid by increasing the speed or torque of motor generator 138.

As the operation of engine 98 continues, the heat in exhaust gas source 134 continues to build, increasing the temperature of the exhaust gas coming from exhaust gas source 134. Eventually, the temperature of the exhaust gas flowing through heat exchanger 132 and exhaust gas circuit 135, as may be indicated by temperature sensor 148, will reach the operating temperature range of exhaust gas receiving portion 136. As the temperature of the exhaust gas approaches the predetermined operating temperature range, control module 142 may send a control signal to heater 122 to reduce or stop heating of the working fluid. Control module 142 may also send a control signal to motor generator 138 to decrease compression of the working fluid, or to eliminate compression altogether, halting flow of working fluid through working fluid circuit 102.

The continued operation of engine 98 causes the temperature of the exhaust gas from engine 98 to continue to increase. The temperature of the exhaust gas, which may be indicated by a temperature signal from temperature sensor 148 to control module 142, may approach the upper limit of or increase beyond a predetermined operating temperature range for exhaust gas receiving portion 136. When the temperature of the exhaust gas approaches a predetermined value that defines the high temperature end of the predetermined operating temperature range for exhaust gas receiving portion 136, control module 142 sends control signals to various components of WHR system 100 to cause WHR system 100 to cool the working fluid in the second mode of operation, the cooling mode, which is shown in FIG. 4. In the cooling mode of operation, working fluid flows through working fluid circuit 102 in the direction shown by the arrows in FIG. 4, which is generally clockwise. The cooled working fluid then decreases the temperature of the exhaust gas flowing through heat exchanger 132 to keep the exhaust gas within the predetermined operating temperature range. The heat transferred to the working fluid may then be used to drive other systems through energy transfer portion 106, thus extracting useful work from the excess heat contained in the exhaust gas flow stream.

To configure WHR system 100 to cool the liquid working fluid in the cooling mode, control module 142 sends a control signal to switching valve 112 to connect feed pump 128 to condenser-evaporator 120 by permitting flow through first branch 124 while blocking flow through second branch 126. Evaporator-condenser 120 may have active cooling elements adapted to receive control signals from control module 142. Evaporator-condenser 120 may also be cooled by airflow from a variety of sources or by other systems that may or may not be controllable by signals from control module 142. If control module 142 is able to control the cooling of evaporator-condenser 120, then control module 142 may send a signal to evaporator-condenser 120 to begin cooling or subcooling of the working fluid in evaporator-condenser 120, depending on the temperature of the working fluid as indicated by a signal from temperature sensor 152 and the amount of cooling needed by the exhaust gas in heat exchanger 132. The need to cool the exhaust gas may be indicated by at least one of first temperature sensor 146 and first temperature sensor 148. Control module 142 also sends a control signal to feed pump 128, causing feed pump 128 to operate, pulling liquid working fluid from evaporator 120 and moving the liquid working fluid downstream to heat exchanger 132.

The liquid working fluid flowing through heat exchanger 132 cools the exhaust gas flowing through heat exchanger 132, simultaneously heating the working fluid and boiling or evaporating the working fluid to form a hot, high-pressure vapor. The hot, vaporized working fluid flows downstream to energy transfer portion 106, which now functions as an energy conversion device. Energy transfer portion 106 is capable of producing additional work or transferring energy to another device or system. In the present embodiment, energy transfer portion 106 includes motor generator 138, which is capable of rotating turbine-compressor 140 and which is capable of receiving energy from rotating turbine-compressor 140. In the present mode of operation, the expanding working fluid vapor provides additional work that can be fed into the engine's driveline. For example, the work may be fed into a driveline or an engine output of internal combustion engine 98 to supplement the engine's power, or it can be used to power electrical devices, parasitics or a storage battery (not shown). Alternatively, energy transfer portion 106 can be used to transfer energy from one system to another system (e.g., to transfer heat energy from WHR system 100 to a fluid for a heating system).

As the vaporized working fluid flows through energy transfer portion 106, the vaporized working fluid loses pressure and heat. The vaporized working fluid flows downstream to condenser-evaporator 120, where the working fluid is cooled, condensed, and may be stored in preparation for repeating the cycle described above.

Figure 5:
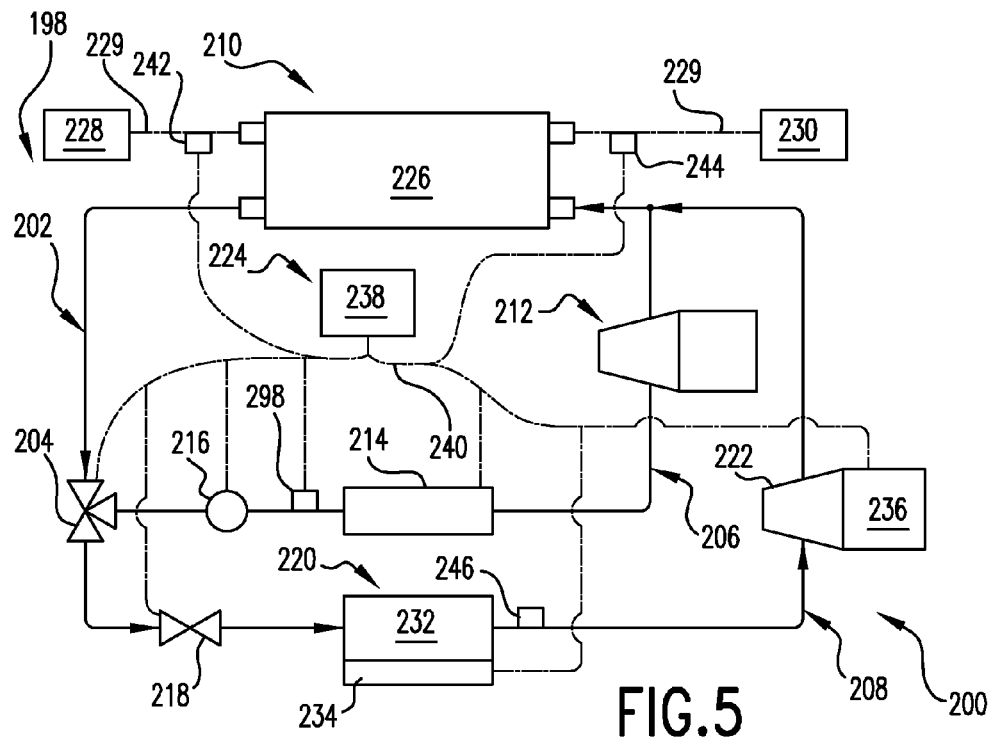
FIG. 5 is a schematic of a third exemplary embodiment of the present disclosure with the WHR system configured for a first, heating mode of operation.

A third exemplary embodiment in accordance with the present disclosure is shown in FIGS. 4 and 5. An internal combustion engine 198 includes a bi-directional or reversible WHR system 200, an exhaust gas source 228, an exhaust gas circuit 229, and an exhaust gas receiving portion 230. As with WHR system 100, WHR system 200 combines the features of a conventional WHR system, such as WHR system 10 shown in FIG. 1, with the features of a reversed WHR system, such as WHR system 50 shown in FIG. 2.

WHR system 200 includes a working fluid circuit 202, a switching valve 204, and a heat exchange portion 210. Working fluid circuit 202 includes a first branch 206 and a second branch 208. WHR system 200 also includes an energy conversion portion 212, a fluid cooling and containment system (FCCS) 214, and a feed pump 216, all positioned along first branch 206. WHR system 200 further includes an expansion valve 218, an evaporation portion 220, and a compressor 222, all positioned along second branch 208 that is in parallel to first branch 206. WHR system 200 also includes a control system 224.

Switching valve 204 connects heat exchange portion 210 to first branch 206 and second branch 208. As will be explained in more detail hereinbelow, when switching valve 204 connects heat exchange portion 210 to first branch 206, then heat exchange portion 210 is downstream from switching valve 204. When switching valve 204 connects heat exchange portion 210 to second branch 208, heat exchange portion 210 is upstream from switching valve 204. While switching valve 204 is shown as a three-way valve, valve 204 could be multiple two-way valves, with a first valve positioned between heat exchange 210 and expansion valve 218 and a second valve connected along a branch that extends from between the first valve and heat exchange portion 210 to feed pump 216.

Downstream from switching valve 204 and along second branch 208 is expansion valve 218. Compressor 222 is located along second branch 208 between expansion valve 218 and heat exchange portion 210. Evaporation portion 220 is located along second branch 208 between expansion valve 218 and compressor 222. FCCS 214 is located along first branch 206 between switching valve 204 and heat exchange portion 210. Feed pump 216 is positioned along first branch 206 downstream FCCS 214 and upstream from switching valve 204. Energy conversion portion 212 is positioned along first branch 206 between heat exchange portion 210 and FCCS 214, upstream from FCCS 214.

Heat exchange portion 210 includes a heat exchanger 226 located along heat exchange circuit 229 to receive exhaust gas from exhaust gas source 228. A first end of heat exchanger 226 connects to switching valve 204. A second, opposite end of heat exchanger 226 connects to first branch 206 and to second branch 208. Heat exchanger 226 serves to act as an evaporator/boiler or as a condenser. Heat exchanger 226 receives exhaust gas from exhaust gas source 228. Exhaust gas source 228 may include conventional elements such as an exhaust manifold (not shown). The exhaust gas received from exhaust gas source 228 flows along heat exchange circuit 229 through heat exchanger 226 and downstream to exhaust gas receiving portion 230. Exhaust gas receiving portion 230 may include a conventional exhaust gas recirculation (EGR) system or a conventional aftertreatment system.

Energy conversion portion 212 located along first branch 206 is capable of producing additional work or transferring energy to another device or system. For example, energy conversion portion 212 may be a turbine, piston, scroll, screw, or other type of expander device that moves, e.g., rotates, as a result of expanding working fluid vapor to provide additional work. The additional work can be fed into the engine's driveline to supplement the engine's power either mechanically or electrically (e.g., by turning a generator), or it can be used to drive a generator and power electrical devices, parasitics or a storage battery (not shown). Alternatively, energy conversion portion 212 can be used to transfer energy from one system to another system (e.g., to transfer heat energy from WHR system 200 to a fluid for a heating system). One type of energy conversion portion 212 is described in more detail in U.S. patent application Ser. No. 13/347,322, filed Jan. 10, 2012, the entire content of which is hereby incorporated by reference.

Downstream from energy conversion portion 212 is FCCS 214. FCCS 214 may include a plurality of devices, such as a receiver and a sub-cooler, in addition to a condenser. FCCS 214 serves to cool and store working fluid when WHR system 200 is configured to flow through first branch 206. As previously noted, downstream from FCCS 214 is feed pump 216, which is upstream from switching valve 204.

Positioned along second branch 208 downstream from switching valve 204 is expansion valve 218. As will be seen, expansion valve 218 causes a decrease in the pressure of liquid working fluid passing through it, causing the liquid working fluid to partially vaporize and cool. Evaporation portion 220 is positioned along second branch 208 downstream from expansion valve 218. Evaporation portion 220 includes an evaporator 232 and may include a heater or heat source 234 to assist in the vaporization of working fluid flowing through second branch 208. Compressor 222 positioned downstream from evaporation portion 220 is driven by a motor 236.

Control system 224 includes a control module 238, a wire harness 240, and a plurality of temperature sensors. Control module 238 may be similar to control module 78 of the first exemplary embodiment of the present disclosure or control module 142 of the second exemplary embodiment of the present disclosure. Wire harness 240 may be similar to wire harness 80 of the first exemplary embodiment of the present disclosure or to wire harness 144 of the second exemplary embodiment of the present disclosure. The plurality of temperature sensors may include a first temperature sensor 242 positioned along exhaust gas circuit 229 upstream from heat exchange portion 210, a second temperature sensor 244 positioned along exhaust gas circuit 229 downstream from heat exchange portion 210, a third temperature sensor 246 positioned along working fluid circuit 202 between compressor portion 222 and evaporation portion 220, and a fourth temperature sensor 248 positioned along working fluid circuit 202 between switching valve 204 and FCCS 214. These temperature sensors provide signals to control module 238 indicative of the temperature of the working fluid in working fluid circuit 202. Control module 238 may send control signals to various portions of WHR system 200 based on the signals from the various temperature sensors. For example, control module 238 may send control signals to switching valve 204, FCCS 214, heater 234, working fluid pump 216, and motor 236.

Figure 6:
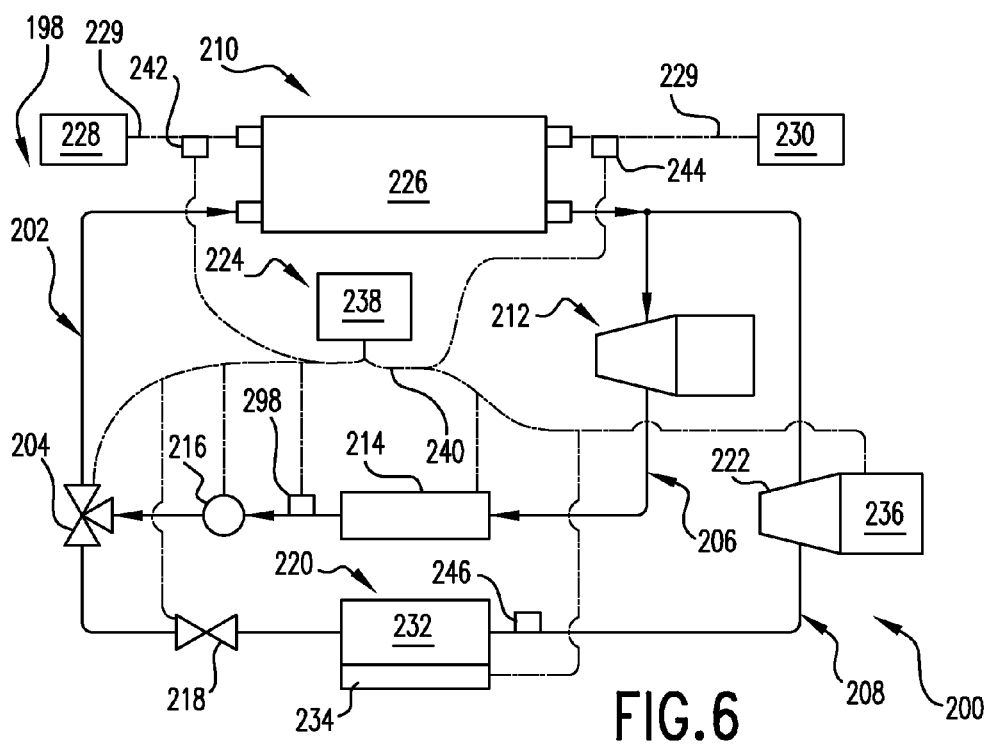
FIG. 6 is the schematic of FIG. 5 with the WHR system configured for a second, cooling mode of operation.

WHR system 200 includes two modes of operation, which are generally dependent on the temperature of the exhaust gas flowing through heat exchange portion 210, which may be indicated by signals from first temperature sensor 242 and second temperature sensor 244 to control module 238. The first mode of operation may be described as a heating mode from the perspective of the exhaust gas and is shown in FIG. 5. The second mode of operation may be described as a cooling mode from the perspective of the exhaust gas and is shown in FIG. 6.

Control module 238 may determine that the temperature of the exhaust gas flowing along exhaust gas circuit 229 to exhaust gas receiving portion 230 is less than a predetermined temperature range necessary for the proper functioning of gas receiving portion 230. For example, gas receiving portion 230 may include one or more oxidation catalysts or SCR devices requiring a temperature range well above ambient for proper operation. During initial or cold start of engine 198, the temperature of the exhaust gas may be at ambient, which could be a relatively cold ambient during cold weather operation. Because gas receiving portion 230 operates either poorly or not at all at temperatures less than a predetermined temperature range, engine 198 could have an elevated level of emissions, which may include NOx and carbon monoxide, until the temperature of the exhaust gas is increased to be within the predetermined temperature range.

If control module 238 determines that the temperature of the exhaust gas is less than the predetermined temperature range, then control module 238 configures WHR system 200 to operate in the heating mode, shown in FIG. 5. In the heating mode of operation, working fluid flows through working fluid circuit 202 in the direction shown by the arrows in FIG. 5, which is generally counter-clockwise. Control module 238 may send a control signal to heater 234 to cause heater 234 to operate, if heater 234 is present. Control module 238 then sends a control signal to motor 236 to cause compressor 222 to pump working fluid from evaporator 232 downstream to heat exchange portion 210. Control module further sends a control signal to switching valve 204 to fluidly connect second branch 208 to heat exchange portion 210, permitting flow through second branch 208 while blocking flow through first branch 206. If present, heater 234 raises the temperature of working fluid in evaporator 232, vaporizing the working fluid. The vaporized working fluid flows toward compressor 222, where the vaporized working fluid is compressed, simultaneously superheating the vaporized working fluid. The superheated working fluid flows downstream into heat exchanger 226, where the heat from the working fluid transfers to the exhaust gas flowing through heat exchanger 226, cooling and condensing the working fluid to a liquid. Thus, heat exchanger 226 functions as a condenser in this mode of operation. The liquid working fluid flows from heat exchanger 226 downstream to switching valve 204. Because switching valve 204 provides a flow path through second branch 208, the liquid working fluid flows through conventional expansion valve 218. As the liquid working fluid flows through conventional expansion valve 218, the pressure of the liquid working fluid drops dramatically, causing a portion of the working fluid to vaporize and causing the working fluid to rapidly cool. Expansion valve 218 may be adjustable to vary the amount of expansion of the working fluid. Control module 238 may send control signals to expansion valve 218 to adjust expansion valve 218, and thus the amount of cooling provided by expansion valve 218, depending on the temperature needs of exhaust gas receiving portion 230. The working fluid then flows downstream to evaporator 232, where the process may begin again.

During operation of WHR system 200, control module 238 continuously monitors the temperature of the exhaust gas flowing through heat exchanger 226 and the temperature of the working fluid flowing through working fluid circuit 202. For example, if the temperature of the exhaust gas is lower than a predetermined temperature range, then control module 238 may determine by way of a temperature signal from temperature sensor 246 whether additional heat may be added to the working fluid. If additional heat may be added, control module 238 either may continue to operate heater 234 or may increase the temperature of heater 234, if possible. Control module 238 may also be able to increase the amount of compression of the working fluid by increasing the speed or torque of motor 236 as well as controlling the on and off cycling of motor 236.

As the operation of engine 198 continues, the heat in associated exhaust gas source 228 continues to build, increasing the temperature of the exhaust gas coming from exhaust gas source 228. Eventually, the temperature of the exhaust gas flowing into heat exchanger 226, as may be indicated by temperature sensor 242, will reach the operating temperature range of exhaust gas receiving portion 230. As the temperature of the exhaust gas approaches the predetermined operating temperature range, control module 238 may send a control signal to heater 234 to cause heater 234 to decrease heating or to cease heating. Control module 238 may also send a control signal to motor 236 to decrease compression of the working fluid, or to eliminate compression altogether, halting flow of working fluid through working fluid circuit 202.

The continued operation of engine 198 causes the temperature of the exhaust gas from exhaust gas source 228 to continue to increase, until the temperature of the exhaust gas, which may be indicated by a temperature signal from temperature sensor 242 or temperature sensor 244 to control module 238, increases beyond a predetermined operating temperature range for exhaust gas receiving portion 230. When the temperature of the exhaust gas increases to a predetermined value that defines the high temperature end of the predetermined operating temperature range for exhaust gas receiving portion 230, control module 238 sends signals to various components of WHR 200 to cause WHR 200 to cool the working fluid in the second mode of operation, the cooling mode, as shown in FIG. 6. In the cooling mode of operation, working fluid flows through working fluid circuit 202 in the direction shown by the arrows in FIG. 6, which is generally clockwise. The cooled working fluid then decreases the temperature of the exhaust gas flowing through heat exchanger 226 to keep the exhaust gas within the predetermined operating temperature range.

To configure WHR system 200 to cool the liquid working fluid in the cooling mode, control module 238 sends a control signal to switching valve 204 to connect feed pump 216 to heat exchanger 226 by permitting flow through first branch 206 while blocking flow through second branch 208. If control module 238 is able to control the cooling of FCCS 214, then control module 238 may send a signal to FCCS 214 to begin cooling or sub-cooling of the working fluid in FCCS 214, depending on the temperature of the working fluid as indicated by a signal from temperature sensor 248 and the amount of cooling needed by the exhaust gas in heat exchanger 226. Control module 238 also sends a control signal to feed pump 216, causing feed pump 216 to operate, pulling liquid working fluid from FCCS 214 and moving the liquid working fluid downstream to heat exchanger 226.

The liquid working fluid flowing through heat exchanger 226 cools the exhaust gas flowing through heat exchanger 226, simultaneously heating and evaporating or boiling the working fluid and forming a hot, high-pressure vapor. The hot, vaporized working fluid flows downstream to energy conversion portion 212. Energy conversion portion 212 is capable of producing additional work or transferring energy to another device or system. For example, energy conversion portion 212 may be a turbine, piston, scroll, screw, or other type of expander device that moves, e.g., rotates, as a result of expanding working fluid vapor to provide additional work. The additional work can be fed into the engine's driveline to supplement the engine's power either mechanically or electrically (e.g., by turning a generator), or it can be used to drive a generator and power electrical devices, parasitics or a storage battery (not shown). Alternatively, energy conversion portion 212 can be used to transfer energy from one system to another system (e.g., to transfer heat energy from WHR system 200 to a fluid for a heating system).

The working fluid loses pressure and heat as it flows through energy conversion portion 212. Downstream from energy conversion portion 212, the working fluid flows into FCCS 214, where the working fluid condenses into a liquid. The working fluid, now a liquid, may be sub-cooled and stored in FCCS 214, which may include a unitary condenser and sub-cooler, a separate condenser and a sub-cooler, a receiver, and other elements, in preparation for repeating the cycle described above.

Figure 7:
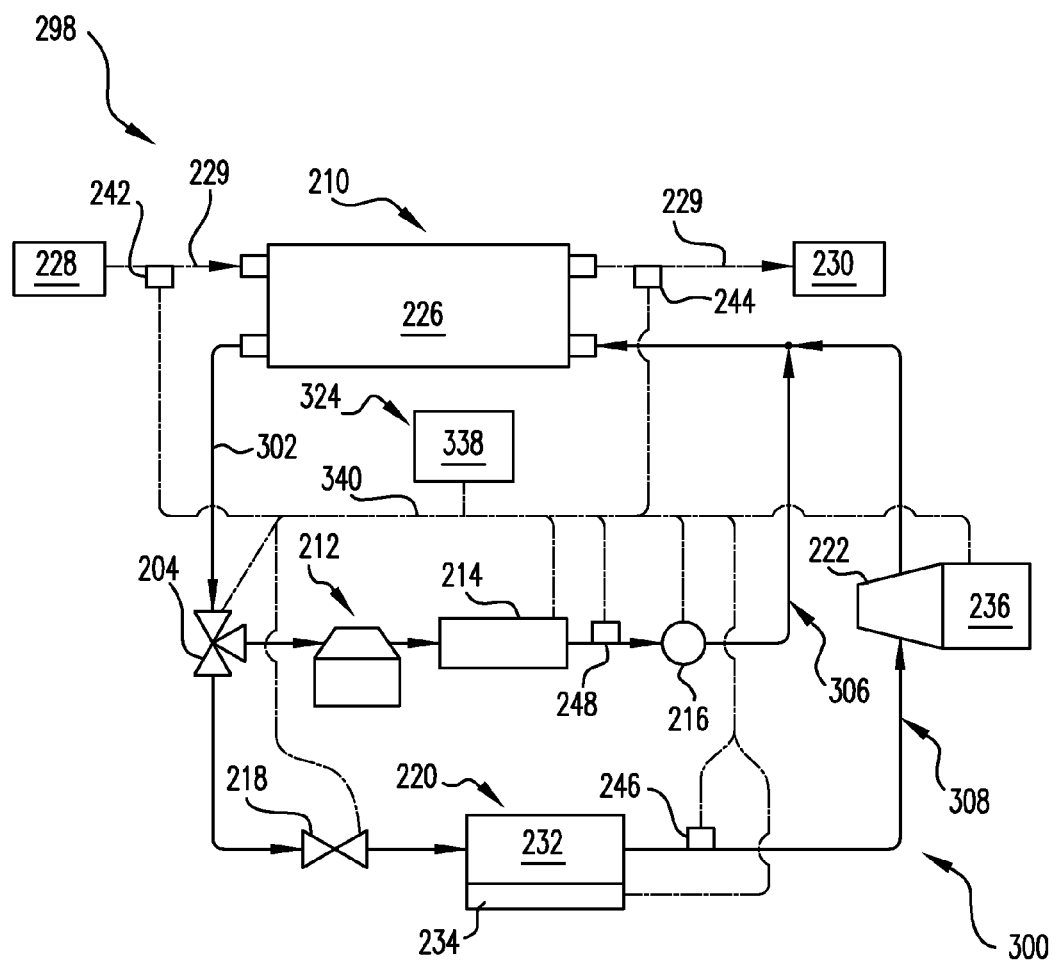
FIG. 7 is a schematic of a fourth exemplary embodiment of the present disclosure.

A fourth exemplary embodiment in accordance with the present disclosure is shown in FIG. 7. An internal combustion engine 298 includes a WHR system 300, exhaust gas source 228, exhaust gas circuit 229, and exhaust gas receiving portion 230. As with WHR system 200, WHR system 300 combines the features of a conventional WHR system, such as WHR system 10 shown in FIG. 1, with the features of a reversed WHR system, such as WHR system 50 shown in FIG. 2.

WHR system 300 includes a working fluid circuit 302, switching valve 204, and heat exchange portion 210. Working fluid circuit 302 includes a first branch 306 and a second branch 308. WHR system 300 also includes energy conversion portion 212, fluid cooling and containment system (FCCS) 214, and feed pump 216, all positioned along first branch 306. WHR system 300 further includes expansion valve 218, evaporation portion 220, and compressor 222, all positioned along second branch 308 that is in parallel to first branch 306. WHR system 300 also includes a control system 324.

Switching valve 204 connects heat exchange portion 210 to first branch 306 and second branch 308. While switching valve 204 is shown as a three-way valve, valve 204 could be multiple two-way valves, with a first valve positioned between heat exchange portion 210 and expansion valve 218 and a second valve connected along a branch that extends from between the first valve and heat exchange portion 210 to energy conversion portion 212.

Downstream from switching valve 204 and along second branch 308 is expansion valve 218. Compressor 222 is located along second branch 308 between expansion valve 218 and heat exchange portion 210. Evaporation portion 220 is located along second branch 308 between expansion valve 218 and compressor 222. FCCS 214 is located along first branch 306 between switching valve 204 and heat exchange portion 210. Feed pump 216 is positioned along first branch 306 downstream from FCCS 214 and upstream from heat exchange portion 210. Energy conversion portion 212 is positioned along first branch 306 between switching valve 204 and FCCS 214, upstream from FCCS 214.

Heat exchange portion 210 includes heat exchanger 226 located along heat exchange circuit 229 to receive exhaust gas from exhaust gas source 228. A first end of heat exchanger 226 connects to switching valve 204. A second, opposite end of heat exchanger 226 connects to first branch 306 and to second branch 308. Heat exchanger 226 serves to act as an evaporator/boiler or as a condenser. Heat exchanger 226 receives exhaust gas from exhaust gas source 228. Exhaust gas source 228 may include conventional elements such as an exhaust manifold (not shown). The exhaust gas received from exhaust gas source 228 flows along heat exchange circuit 229 through heat exchanger 226 and downstream to exhaust gas receiving portion 230. Exhaust gas receiving portion 230 may include a conventional exhaust gas recirculation (EGR) system or a conventional aftertreatment system.

Energy conversion portion 212 located along first branch 306 is capable of producing additional work or transferring energy to another device or system. For example, energy conversion portion 212 may be a turbine, piston, scroll, screw, or other type of expander device that moves, e.g., rotates, as a result of expanding working fluid vapor to provide additional work. The additional work can be fed into the engine's driveline to supplement the engine's power either mechanically or electrically (e.g., by turning a generator), or it can be used to drive a generator and power electrical devices, parasitics or a storage battery (not shown). Alternatively, energy conversion portion 212 can be used to transfer energy from one system to another system (e.g., to transfer heat energy from WHR system 300 to a fluid for a heating system).

Downstream from energy conversion portion 212 is FCCS 214. FCCS 214 may include a plurality of devices, such as a receiver and a sub-cooler, in addition to a condenser. FCCS 214 serves to cool and store working fluid when WHR system 300 is configured to flow through first branch 306. As previously noted, downstream from FCCS 214 is feed pump 216, which is upstream from heat exchange portion 210.

Positioned along second branch 308 downstream from switching valve 204 is expansion valve 218. As will be seen, expansion valve 218 causes a decrease in the pressure of liquid working fluid passing through it, causing the liquid working fluid to partially vaporize and cool. Evaporation portion 220 is positioned along second branch 308 downstream from expansion valve 218. Evaporation portion 220 includes an evaporator 232 and may include a heater or heat source 234 to assist in the vaporization of working fluid flowing through second branch 308. Compressor 222 positioned downstream from evaporation portion 220 may be driven by motor 236.

Control system 324 includes a control module 338, a wire harness 340, and a plurality of temperature sensors. Control module 338 may be similar to control module 78 of the first exemplary embodiment of the present disclosure or control module 142 of the second exemplary embodiment of the present disclosure. Wire harness 340 may be similar to wire harness 80 of the first exemplary embodiment of the present disclosure or to wire harness 144 of the second exemplary embodiment of the present disclosure. The plurality of temperature sensors may include first temperature sensor 242 positioned along exhaust gas circuit 229 upstream from heat exchange portion 210, second temperature sensor 244 positioned along exhaust gas circuit 229 downstream from heat exchange portion 210, third temperature sensor 246 positioned along working fluid circuit 302 between compressor portion 222 and evaporation portion 220, and fourth temperature sensor 248 positioned along working fluid circuit 302 between FCCS 214 and heat exchange portion 226. These temperature sensors provide signals to control module 338 indicative of the temperature of the working fluid in working fluid circuit 302. Control module 338 may send control signals to various portions of WHR system 300 based on the signals from the various temperature sensors. For example, control module 338 may send control signals to switching valve 204, FCCS 214, heater 234, working fluid pump 216, and motor 236.

WHR system 300 includes two modes of operation, which are generally dependent on the temperature of the exhaust gas flowing through heat exchange portion 210, and which may be indicated by signals from first temperature sensor 242 and second temperature sensor 244 to control module 338. The first mode of operation may be described as a heating mode from the perspective of the exhaust gas. The second mode of operation may be described as a cooling mode from the perspective of the exhaust gas.

Control module 338 may determine that the temperature of the exhaust gas flowing along exhaust gas circuit 229 to exhaust gas receiving portion 230 is less than a predetermined temperature range necessary for the proper functioning of gas receiving portion 230. For example, gas receiving portion 230 may include one or more oxidation catalysts or SCR devices requiring a temperature range well above ambient for proper operation. During initial or cold start of engine 198, the temperature of the exhaust gas may be at ambient, which could be a relatively cold ambient during cold weather operation. Because gas receiving portion 230 operates either poorly or not at all at temperatures less than a predetermined temperature range, engine 198 could have an elevated level of emissions, which may include NOx and carbon monoxide, until the temperature of the exhaust gas is increased to be within the predetermined temperature range.

If control module 338 determines that the temperature of the exhaust gas is less than the predetermined temperature range, then control module 338 configures WHR system 300 to operate in the heating mode. In the heating mode of operation, working fluid flows through second branch 308 of working fluid circuit 302 in the direction shown by the arrows in FIG. 7, which is generally counter-clockwise. Control module 338 may send a control signal to heater 234 to cause heater 234 to operate. Control module 338 then sends a control signal to motor 236 to cause compressor 222 to pump working fluid from evaporator 232 downstream to heat exchange portion 210. Control module further sends a control signal to switching valve 204 to fluidly connect second branch 308 to heat exchange portion 210, permitting flow through second branch 308 while blocking flow through first branch 306. Heater 234 raises the temperature of working fluid in evaporator 232, vaporizing the working fluid. The vaporized working fluid flows toward compressor 222, where the vaporized working fluid is compressed, simultaneously superheating the vaporized working fluid. The superheated working fluid flows downstream into heat exchanger 226, where the heat from the working fluid transfers to the exhaust gas flowing through heat exchanger 226, cooling and condensing the working fluid to a liquid. Thus, heat exchanger 226 functions as a condenser in this mode of operation. The liquid working fluid flows from heat exchanger 226 downstream to switching valve 204. Because switching valve 204 provides a flow path through second branch 308, the liquid working fluid flows through conventional expansion valve 218. As the liquid working fluid flows through conventional expansion valve 218, the pressure of the liquid working fluid drops dramatically, causing a portion of the working fluid to vaporize and causing the working fluid to rapidly cool. The working fluid then flows downstream to evaporator 232, where the process may begin again.

During operation of WHR system 300, control module 338 continuously monitors the temperature of the exhaust gas flowing through heat exchanger 226 and the temperature of the working fluid flowing through working fluid circuit 302. For example, if the temperature of the exhaust gas is lower than a predetermined temperature range, then control module 338 may determine by way of a temperature signal from temperature sensor 246 whether additional heat may be added to the working fluid. If additional heat may be added, control module 338 either may continue to operate heater 234 or may increase the temperature of heater 234, if possible. Control module 338 may also be able to increase the amount of compression of the working fluid by increasing the speed or torque of motor 236 as well as controlling the on and off cycling of motor 236.

As the operation of engine 198 continues, the heat in associated exhaust gas source 228 continues to build, increasing the temperature of the exhaust gas coming from exhaust gas source 228. Eventually, the temperature of the exhaust gas flowing into heat exchanger 226, as may be indicated by temperature sensor 242, will reach the operating temperature range of exhaust gas receiving portion 230. As the temperature of the exhaust gas approaches the predetermined operating temperature range, control module 338 may send a control signal to heater 234 to cause heater 234 to decrease heating or to cease heating. Control module 338 may also send a control signal to motor 236 to decrease compression of the working fluid, or to eliminate compression altogether, halting flow of working fluid through working fluid circuit 202.

The continued operation of engine 198 causes the temperature of the exhaust gas from exhaust gas source 228 to continue to increase, until the temperature of the exhaust gas, which may be indicated by a temperature signal from temperature sensor 242 or temperature sensor 244 to control module 338, increases beyond a predetermined operating temperature range for exhaust gas receiving portion 230. When the temperature of the exhaust gas increases to a predetermined value that defines the high temperature end of the predetermined operating temperature range for exhaust gas receiving portion 230, control module 338 sends signals to various components of WHR 300 to cause WHR 300 to cool the working fluid in the second mode of operation, the cooling mode. In the cooling mode of operation, working fluid flows through first branch 306 of working fluid circuit 302 in the direction shown by the arrows in FIG. 7, which is generally counter-clockwise. The cooled working fluid then decreases the temperature of the exhaust gas flowing through heat exchanger 226 to keep the exhaust gas within the predetermined operating temperature range.

To configure WHR system 300 to cool the liquid working fluid in the cooling mode, control module 338 sends a control signal to switching valve 204 to connect energy conversion portion 212 to heat exchanger 226 by permitting flow through first branch 306 while blocking flow through second branch 308. If control module 338 is able to control the cooling of FCCS 214, then control module 338 may send a signal to FCCS 214 to begin cooling or sub-cooling of the working fluid in FCCS 214, depending on the temperature of the working fluid as indicated by a signal from temperature sensor 248 and the amount of cooling needed by the exhaust gas in heat exchanger 226. Control module 338 also sends a control signal to feed pump 216, causing feed pump 216 to operate, pulling liquid working fluid from FCCS 214 and moving the liquid working fluid downstream to heat exchanger 226.

The liquid working fluid flowing through heat exchanger 226 cools the exhaust gas flowing through heat exchanger 226, simultaneously heating and evaporating or boiling the working fluid and forming a hot, high-pressure vapor. The hot, vaporized working fluid flows downstream to switching valve 204 and into first branch 306, where the working fluid flows to energy conversion portion 212. Energy conversion portion 212 is capable of producing additional work or transferring energy to another device or system. For example, energy conversion portion 212 may be a turbine, piston, scroll, screw, or other type of expander device that moves, e.g., rotates, as a result of expanding working fluid vapor to provide additional work. The additional work can be fed into the engine's driveline to supplement the engine's power either mechanically or electrically (e.g., by turning a generator), or it can be used to drive a generator and power electrical devices, parasitics or a storage battery (not shown). Alternatively, energy conversion portion 212 can be used to transfer energy from one system to another system (e.g., to transfer heat energy from WHR system 300 to a fluid for a heating system).

The working fluid loses pressure and heat as it flows through energy conversion portion 212. Downstream from energy conversion portion 212, the working fluid flows into FCCS 214, where the working fluid condenses into a liquid. The working fluid, now a liquid, may be sub-cooled and stored in FCCS 214, which may include a unitary condenser and a sub-cooler, a separate condenser and a sub-cooler, a receiver, and other elements, in preparation for repeating the cycle described above.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. A method of heating and cooling an exhaust gas flowing through an exhaust gas circuit of an internal combustion engine, the method comprising:
   directing the exhaust gas through a heat exchanger positioned along the exhaust gas circuit; and
   extending a waste heat recovery (WHR) system, including a working fluid circuit, through the heat exchanger, wherein the WHR system includes a first mode of operation that provides heated working fluid to the heat exchanger and a second mode of operation to provide cooled working fluid to the heat exchanger, and the working fluid flow through the working fluid circuit is in a first direction in one of the first mode and second mode of operation and is in a second direction in the other of the first mode and the second mode of operation.

2. The internal combustion engine of claim 1, further including a control module connected to a temperature sensor located along the exhaust gas circuit and to the working fluid circuit, wherein the control module receives a temperature signal from the temperature sensor indicative of the temperature of the exhaust gas.

3. The internal combustion engine of claim 2, wherein a temperature signal indicative of an exhaust gas temperature less than a minimum predetermined temperature causes the control module to configure the WHR system to operate in the first mode of operation.

4. The internal combustion engine of claim 3, wherein fluid flow through the working fluid circuit is in a first direction.

5. The internal combustion engine of claim 2, wherein a temperature signal indicative of an exhaust gas temperature greater than a maximum predetermined temperature causes the control module to configure the WHR system to operate in the second mode of operation.

6. The internal combustion engine of claim 5, wherein fluid flow through the working fluid is in a second direction.

7. An internal combustion engine, comprising:
   an exhaust gas circuit;
   a heat exchanger positioned along the exhaust gas circuit;
   an exhaust gas receiving portion positioned along the exhaust gas circuit downstream of the heat exchanger; and
   a waste heat recovery (WHR) system including a working fluid circuit extending through the heat exchanger, an expansion valve positioned along the working fluid circuit downstream from the heat exchanger, an evaporator positioned along the working fluid circuit downstream from the expansion valve, and a compressor positioned along the working fluid circuit between the evaporator and the heat exchanger, downstream from the evaporator.

8. The internal combustion engine of claim 7, further including a control module connected to the compressor and to at least one temperature sensor located along the exhaust gas flow, wherein the control module is adapted to send a control signal to the compressor in response to a temperature signal from the at least one temperature sensor.

9. The internal combustion engine of claim 7, the working fluid circuit further including a parallel portion having a first branch and a second branch, and the expansion valve is positioned along the first branch and a feed pump is positioned along the second branch, wherein the WHR system is operable in a first mode wherein the working fluid flows through the first branch and a second mode wherein the working fluid flows through the second branch.

10. The internal combustion engine of claim 9, wherein the first branch and the second branch connect to a switching valve and the working fluid flows through the first branch only in the first mode and the working fluid flows through the second branch only in the second mode.

11. The internal combustion engine of claim 10, further including a compressor portion positioned along the first branch, the compressor portion adapted to be driven by a motor generator, and a control module connected to the switching valve, to the motor generator, and to at least one temperature sensor located along the exhaust gas flow, and the control module is adapted to send control signals to the switching valve and the motor generator to configure the WHR system to operate in the first mode in response to the in response to a temperature signal from the at least one temperature sensor.

12. The internal combustion engine of claim 11, wherein the temperature signal from the at least one temperature sensor indicates the temperature of the exhaust gas flow is lower than a predetermined operating temperature range.

13. The internal combustion engine of claim 10, further including a fluid cooling system positioned along the second branch and a control module connected to the feed pump, the switching valve, and at least one temperature sensor located along the exhaust gas flow, wherein the control module is adapted to send control signals to the feed pump and the switching valve to configure the WHR system to operate in the second mode in response to a temperature signal from the at least one temperature sensor.

14. The internal combustion engine of claim 13, wherein the temperature signal from the at least one temperature sensor indicates the temperature of the exhaust gas flow is higher than a predetermined operating temperature range.

15. An internal combustion engine, comprising:
   an exhaust gas circuit;
   a heat exchanger positioned along the exhaust gas circuit;
   an exhaust gas receiving portion positioned along the exhaust gas circuit downstream of the heat exchanger; and
   a waste heat recovery (WHR) system including a working fluid circuit extending through the heat exchanger, a switching valve positioned along the working fluid circuit, a first branch and a second branch extending between the switching valve and the heat exchanger, an energy conversion portion positioned along the first branch downstream from the switching valve, a fluid containment and cooling system (FCCS) positioned along the first branch between the energy conversion portion and the switching valve, a feed pump positioned along the first branch between the FCCS and the switching valve, an expansion valve positioned along the second branch downstream from the switching valve, a compressor positioned along the second branch downstream of the expansion valve, and an evaporator positioned along the second branch between the expansion valve and the compressor.

16. The internal combustion engine of claim 15, wherein the WHR system is operable in a first mode wherein the working fluid flows from the heat exchanger downstream through the energy conversion portion, then downstream through the FCCS and the feed pump to the switching valve, returning to the heat exchanger.

17. The internal combustion engine of claim 16, wherein the WHR system is operable in a second mode wherein the working fluid flows from heat exchanger downstream to the switching valve, then downstream through the expansion valve and the evaporator, then downstream through the compressor, returning to the heat exchanger.

18. The internal combustion engine of claim 17, further including a control module connected to the switching valve, a motor generator drivingly connected to the turbine-compressor, and at least one temperature sensor located along the exhaust gas flow, and the control module is adapted to send control signals to the switching valve and the motor generator to configure the WHR system to operate in the second mode in response to the in response to a temperature signal from the at least one temperature sensor.

19. The internal combustion engine of claim 18, wherein the temperature signal from the at least one temperature sensor indicates the temperature of the exhaust gas flow is lower than a predetermined operating temperature range.

20. The internal combustion engine of claim 16, further including a control module connected to the feed pump, the switching valve, and at least one temperature sensor located along the exhaust gas flow, and the control module is adapted to send control signals to the feed pump and the switching valve to configure the WHR system to operate in the first mode in response to a temperature signal from the at least one temperature sensor.

21. The internal combustion engine of claim 20, wherein the temperature signal from the at least one temperature sensor indicates the temperature of the exhaust gas flow is higher than a predetermined operating temperature range.

22. The internal combustion engine of claim 15, wherein the WHR system is operable in a first mode wherein the working fluid flows from the heat exchanger downstream through the energy conversion portion, then downstream through the FCCS and the feed pump to the switching valve, returning to the heat exchanger and in a second mode wherein the working fluid flows from heat exchanger downstream to the switching valve, then downstream through the expansion valve, the evaporator, and the compressor, returning to the heat exchanger.

* * * * *